April 2, 1929. R. J. WINSOR 1,707,953
TRACK
Filed April 22, 1925
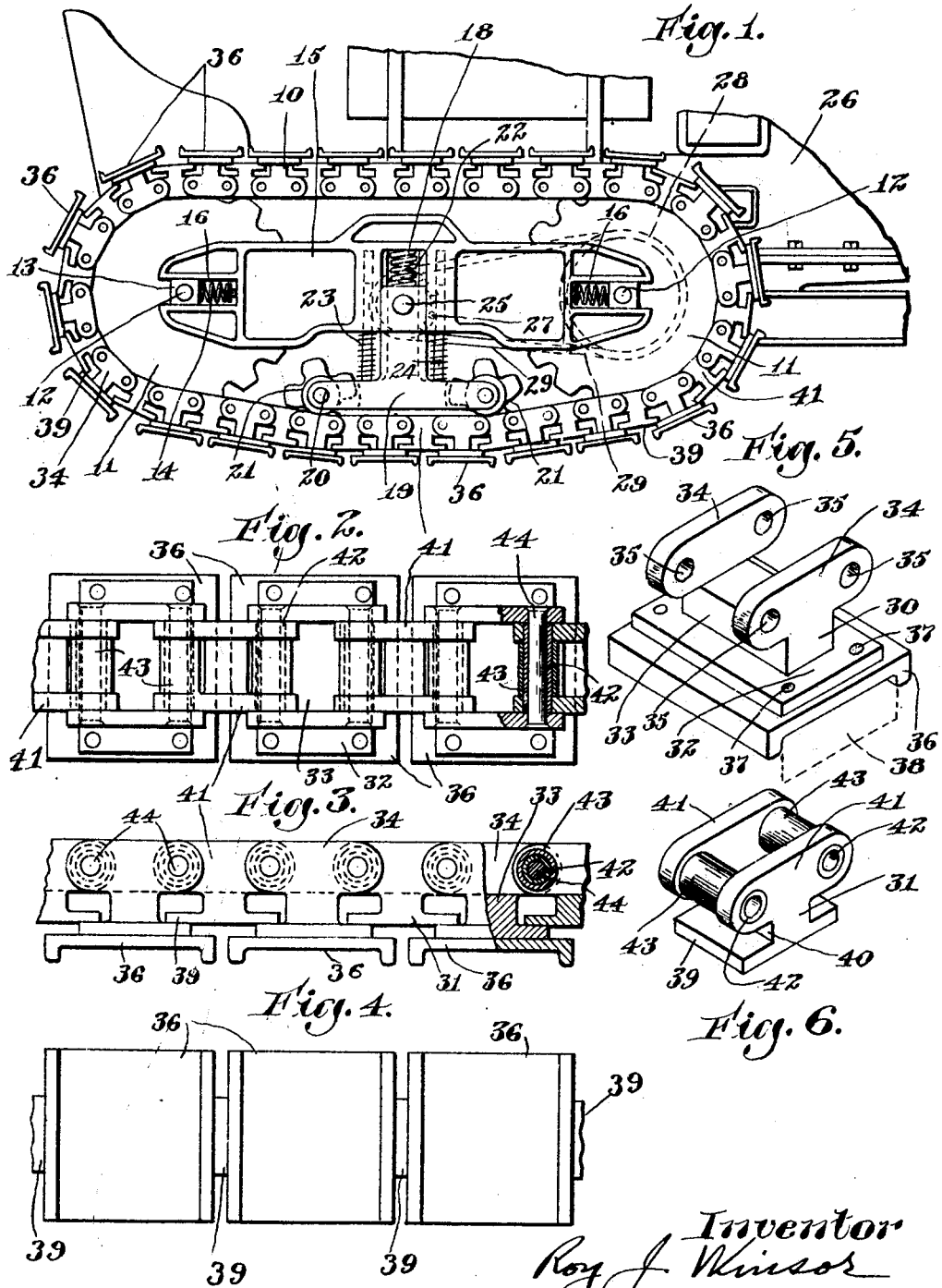
Inventor
Roy J. Winsor
by James R. Hodder
Attorney Patented Apr. 2, 1929.

1,707,953

UNITED STATES PATENT OFFICE.

ROY J. WINSOR, OF BUCYRUS, OHIO.

TRACK.

Application filed April 22, 1925. Serial No. 24,999.

My present invention relates to tractors, and more particularly to an improved tractor tread of the crawler type.

Where it is desired to use tractors of the crawler type in certain situations as, for example, in uneven or swampy ground, some means must be devised for preventing the upward sagging of the lower reach of the crawler tread while enabling the track to be flexed to allow the same to pass over the sprockets or other circular members at the ends. Various expedients have been suggested and provided for utilizing tractors of the crawler type in these situations, none of which, so far as I am aware, have been entirely successful or satisfactory. Where the tractor tread has been self-supporting or, what is termed in the trade, "rigid", it has usually been so rigid as to preclude its proper functioning, and where the proper degree of flexibility has been given to such track, the track has failed to function for this reason alone.

A serious defect in such tracks is the clogging up of the various joints by grit or mud and such clogging up prevents, after a very short time, the free running of the track over the sprockets or other circular members on which they are carried, and throws the various elements of the track so far out of alignment with each other as to cause the same to "jump" off the circular members over which the tracks run.

In my present invention I have endeavored to obviate the objections to prior devices and as above pointed out and have produced a self-supporting track or "rigid" track member in which the track, after being assembled, is self-supporting and in which the lower reach thereof will not sag upward, and further, such track is extremely flexible in passing over the rollers or sprockets and the joints are so constructed as to be practically self-cleaning. Further, the construction of the track elements is such that the elements are subjected to the least possible wear and no wear comes on the track elements themselves because of the pivotal joint connections, all wear being taken up by inserted steel bushings or pins which may be readily removed and renewed.

In tractors employing tracks of the crawler type, the track engages with the ground and supports the load carried by the tractor. With an extremely heavy load, it is essential that a considerable portion, if not the entire length, of the lower reach of the track be in engagement with the ground, this for the purpose of obtaining the necessary traction. When, however, the tractor is carrying only a light load, it is only necessary that a relatively small portion of the lower reach of the track be in engagement with the ground as sufficient traction will be obtained thereby and any other traction in excess of that required is merely consuming power needlessly. In my present invention, therefore, I have devised a means for attaching the track to the crawler whereby a portion of the load of the tractor is held by the lower reach of the track, and as the load is increased, the lower reach of the track is "flattened" out and is gradually brought more nearly into a horizontal plane or into a position in engagement with the ground as the load is increased. I believe this to be an entirely new feature in track construction and therefore desire to claim the same broadly.

The principal object of my invention, therefore, is an improved track of the crawler type.

Another object of the invention is a self-supporting track in which wear is reduced to a minimum and which is capable of efficient operation on uneven or marshy ground.

A further object of the invention is an improved means for attaching an endless track to a tractor whereby the weight of the tractor is carried by the lower reach of the tractor.

In the accompanying drawings illustrating the preferred embodiment of my invention, Fig. 1 is a front elevation of the complete track in position on a tractor;

Fig. 2 is an inner plan view of a plurality of track elements in assembled position, a portion being shown in section;

Fig. 3 is a side elevation of Fig. 2, a portion thereof being shown in section;

Fig. 4 is an outer plan view of Fig. 3;

Fig. 5 is a perspective view of one of the track elements, and

Fig. 6 is a perspective view of another of the track elements.

Referring to the drawings, there is illustrated a track designated as an entirety by the numeral 10 in Fig. 1, this track being mounted on sprockets 11 secured to an axle 12 rotatably mounted in bearing blocks 13 slidably mounted in a horizontal plane in guideways 14 formed at the ends of a bolster frame 15. Between the inner ends of the bearing blocks 13 and the inner face of the end of the guideways 14 are arranged coil springs 16, to force the bearing blocks 13, and therefore the shafts 12, outward from each other while maintaining the same parallel. Centrally located with respect to the bolster 15 and on the under side thereof is a vertical slot 18 in which is slidably mounted, for vertical movement, a member 19. This member 19 has arranged at its lower end and at each side thereof shafts 20, these shafts being rotatably mounted in the member 19, and secured on the shafts 20 are sprockets 21 which engage with the upper or inner face of the lower reach of the track members forming the track 10. Between the upper end of the member 19 and the under face of the slot 18 is arranged a heavy coil spring 22 and this construction provides for a spring suspension on the bolster 15 of the top of the member 19. On either side of the member 19 are upwardly extending shafts or rods 23 which slide upward in vertical holes in the bolster 15. Surrounding the rods or shafts 23 and lying between the under face of the bolster 15 and the member 18 are coil springs 24, such springs being relatively light as compared with the spring 22. At the upper end of the member 19 is a bearing in which is rotatably mounted a main shaft 25, this shaft extending transversely of the tractor mechanism, such mechanism being indicated generally by the reference numeral 26. Secured to the shaft 25 is a driving sprocket 27 in line with a sprocket 28 secured to the forward one of the shafts 12 and over the sprockets 27 and 28 runs a driving chain 29 and by means of which the shafts 12 are rotated.

Referring now particularly to Figs. 2–6 inclusive, the track 10 is comprised of a plurality of members 30 and 31 arranged alternately. The member 30 is composed of a rectangular plate 32 of any desired dimensions, and formed integral therewith and extending upwardly therefrom is a base 33 on each end of which is formed parallelly arranged spaced lugs or ears 34. The lugs or ears 34 are drilled, as indicated at 35, at each end, the drilled holes 35 being in alignment with each other at each end of the member 34. Secured to the member 32 on the face thereof opposite the face on which is the member 33 is a plate or spud 36, this plate being secured, preferably, by riveting, as indicated at 37, or in any other desired manner. Preferably the plate 36 has the form shown in the drawings, although this form may be varied as desired. I find this form preferable, however, as it is a commerical form of structure and is easily and economically fabricated. Further, the form is such that there may be secured thereto rubber faces or blocks 38, as indicated in dotted lines in Fig. 5. The distance apart of the holes 35 in the lug 34 may be any distance desired, such distance determining the pitch of the track.

Referring now to Fig. 6 particularly, it will be noted that the element comprises a plate 39 substantially rectangular in form, and formed on the upper face thereof is a member 40 provided at each end with parallely arranged spaced lugs 41. The distance between the outer faces of the lugs 41 is slightly less than the distance between the inner faces of the lugs 34 on the member 30. The ends of the lugs 40 are drilled to receive as a press fit a hardened steel bushing 42, the hole through such bushing 42 being substantially equal to the diameter of the holes 35 in the lugs 34. Before the bushings 42 are pressed into position, there is placed thereover a bushing 43 which is freely rotatable on the bushing 42. The bushings 43 are engaged by the teeth of the sprockets 11. In assembling the members 30 and 31 to form the track 10, the members 31 are first assembled as above described and one end thereof placed in position within the lugs 34 and the pin 44 is passed through the holes 35 and through the holes in the bushings 42 and riveted solidly to the lugs 34. It will thus be seen that the wear due to the flexing of the attached members 30 and 31 acts on the pin 44 and on the inner bushing 42 while the wear occasioned by the teeth of the sprockets 11 acts on the roller bushings 43. There is, therefore, no wear on either the lugs 34 or the lugs 41. When, therefore, it is necessary to repair the track because of looseness of the joints, it is merely necessary to drive out the pin 44, replace the bushing 42, insert a new bushing 42 and rivet a new pin 44 in position in the lugs 34. Referring now to Fig. 3, it will be noted that the ends of the substantially rectangular member 39 rest on the ends of the rectangular member 32 and this construction provides a track which will not buckle upward beyond the horizontal position shown in such Fig. 3.

The track 10 having been assembled from a plurality of elements 30 and 31, as above described, and placed in position on the sprockets 11 with the sprockets 21 in position to engage with the roller bushings 43 on the lower reach of the track, as shown in Fig. 1, it will be seen that, with no load or a light load on the tractor 26, the resiliency of the springs 22 and 23 will be suffiicent to force the lower reach of the track 10 downwardly at its center and it assumes an arcuate form with a small portion only in engagement with the ground. Further, it will obvious that, with no load or a light load on the tractor 26, the load is carried on the springs 22 and 23 and that the bolsters 15 do not at this time carry any of the load. When, however, the load on the tractor 26 is increased to such a point that the resiliency of the springs 22 and 23 is completely overcome, the upper end of the member 19 will be brought into its uppermost position toward the upper end of the slot 18 in the bolster 15 and the lower reach of the track 10 will be flattened out so that more of it will come into engagement with the ground, and at this time it will be apparent that the load on the tractor 26, as well as the tractor itself, is being supported directly by the bolster 15. With my improved construction, a self-supporting, rigid track or rail is produced and in which a light load is spring suspended while a heavy load is carried directly on the rigid bolster tractor 15. This construction eliminates to a considerable extent the wear heretofore deemed necessary in prior constructions and makes for a device that is efficient and long lived. Further, this method of spring suspension of the tractor under no, or light, load enables the tractor to be driven in such condition at a relatively high speed without undue wear taking place in the mechanism.

While I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

An improved track comprising a plurality of two different elements arranged alternately, one of said elements comprising a rectangular plate, a base formed integral therewith and having formed at each end a plurality of parallelly arranged lugs, the second of said elements being composed of a rectangular plate having a base formed integral therewith, and having at each end parallelly arranged lugs, a plurality of pairs of alined perforations in said lugs, shafts extending through the lugs in said first said elements and through the aligned perforation in the second said elements, the outer face of the rectangular plate on the second element engaging with the inner face of the rectangular plate of the first element, whereby pivotal movement of the elements with respect to each other takes place in one direction only from the rectangular plate.

In testimony whereof, I have signed my name to this specification.

ROY J. WINSOR.